Nov. 22, 1966  H. SHAPIRO ET AL  3,286,531

OMNI-DIRECTIONAL ANISOTROPIC MOLECULAR TRAP

Filed June 3, 1964

INVENTORS
HAROLD SHAPIRO
WILLIAM F. HARDGROVE
BY
*[signatures]*
ATTORNEYS

United States Patent Office 3,286,531
Patented Nov. 22, 1966

3,286,531
OMNI-DIRECTIONAL ANISOTROPIC
MOLECULAR TRAP
Harold Shapiro, Silver Spring, and William F. Hardgrove,
Forest Heights, Md., assignors to the United States of
America as represented by the Administrator of the
National Aeronautics and Space Administration
Filed June 3, 1964, Ser. No. 372,438
18 Claims. (Cl. 73—432)

The invention described herein may be manufactured and used by or for the Government of the United States of America for governmental purposes without the payment of any royalties thereon or therefor.

The present invention relates to an apparatus used in conjunction with a vacuum chamber to more exactly simulate therein environmental conditions in outer space, and more particularly, to an apparatus for preventing molecules emitted from a test object in a vacuum chamber from returning and impinging upon the test object.

Within the framework of the philosophy of testing and evaluating spacecrafts and their components the closer an approach is made to simulating actual operational conditions the more thorough and informative are the test results. In the vacuum of empty space, molecules leaving an exposed surface of an object have essentially no probability of returning thereto. Present day vacuum environmental chambers have only partially duplicated this property because inherent in vacuum chambers is the problem of molecular "bounce-back," i.e., molecules emitted from various portions of a test object, within the vacuum chamber, leave the object and rebound from the chamber walls. A statistical number of these rebounding molecules impinge upon the test object. With this condition existing in the chamber, it can readily be observed that actual space conditions are far from being simulated.

The schemes presently in use in vacuum technology to prevent the return of the rebounding molecules are: panels containing liquid gases at very low temperatures; baffles to provide torturous paths, chemical substances which absorb molecules, and pumps of various sorts—all being used in an attempt to improve the degree of vacuum. However, all of these methods have some disadvantage in achieving their goal of preventing molecular "bounce-back" to the test object. Cold panels cannot freeze the so-called "non-condensible" gases, nor prevent some finite percentage of those molecules hitting cold surfaces from rebounding; baffles throttle the flow of gases and generally produce inefficient pumping systems; chemical absorbents are more sensitive to some gases, less so to others, have limited capacities to absorb, and must be alternatively heated and cooled; and pumps must be very carefully constructed, require high voltage, contaminate vacuum systems with their own oils or other by-products and never remove all of the molecules they are intended to remove.

Accordingly, it is an object of the present invention to provide a novel apparatus for achieving, in an extremely low pressure environmental chamber, an area that is essentially free of molecules initiated by a test object placed therein.

It is another object of the present invention to provide means for obtaining an environmental condition closely approximating that found beyond atmospheric limits.

It is a further object of the present invention to provide a simple, inexpensive, effective apparatus and method for simulating the conditions existing in outer space in an environmental chamber.

It is still a further object of the present invention to provide means for insuring that molecules leaving a vehicle under test in a vacuum chamber will find an exit and not return to the vehicle.

These and other objects are carried out by the present invention wherein six hollow truncated pyramids are joined together at their narrow ends and projected into the x, y and z planes to form an omni-directional anisotropic molecular trap having an area therein outlined by the sharp edges of the junctions of the narrow ends where the pyramids are joined. When this particular structure is located in a vacuum chamber and a test object is placed in the defined area, molecules vaporized by the test object, having mostly open space and only a few sharp edges before them, tend to move away from the test area and escape via the hollow pyramids. The slanted walls of the structure result in there being a greater probability for the molecules to rebound away from the test object than toward it. The escaping molecules are, for the most part, ultimately removed by the normal operation of the vacuum pump of the vacuum chamber.

The exact nature of this invention, as well as other objects and advantages thereof, will be readily apparent from consideration of the following specification relating to the annexed drawings in which.

Figure 1:
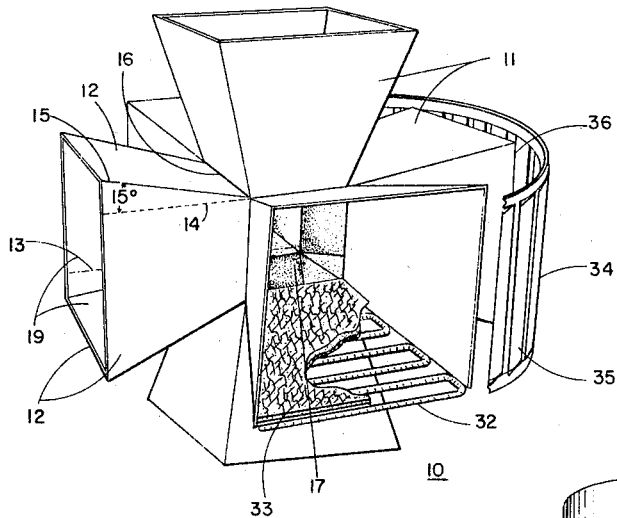
FIGURE 1 is a perspective view of a preferred embodiment of the invention.

Referring now to the drawings, wherein like reference characters designate like or corresponding parts throughout, there is shown in the figures an omni-directional anisotropic molecular trap (ODAMT) 10 comprising six hollow tetrahedral truncated pyramids 11. Sides 12 of each pyramid 11 are sloped at approximately 15 degrees from the central axis 13 of the respective pyramid. To indicate the relationship of the slope of a side 12 of one pyramid to its central axis 13, a line 14, as shown in FIGURE 1, is drawn parallel to central axis 13 to intersect edge 15 of side 12. The angle formed between edge 15 and line 14 represents the 15-degree slope of side 12.

Figure 2:
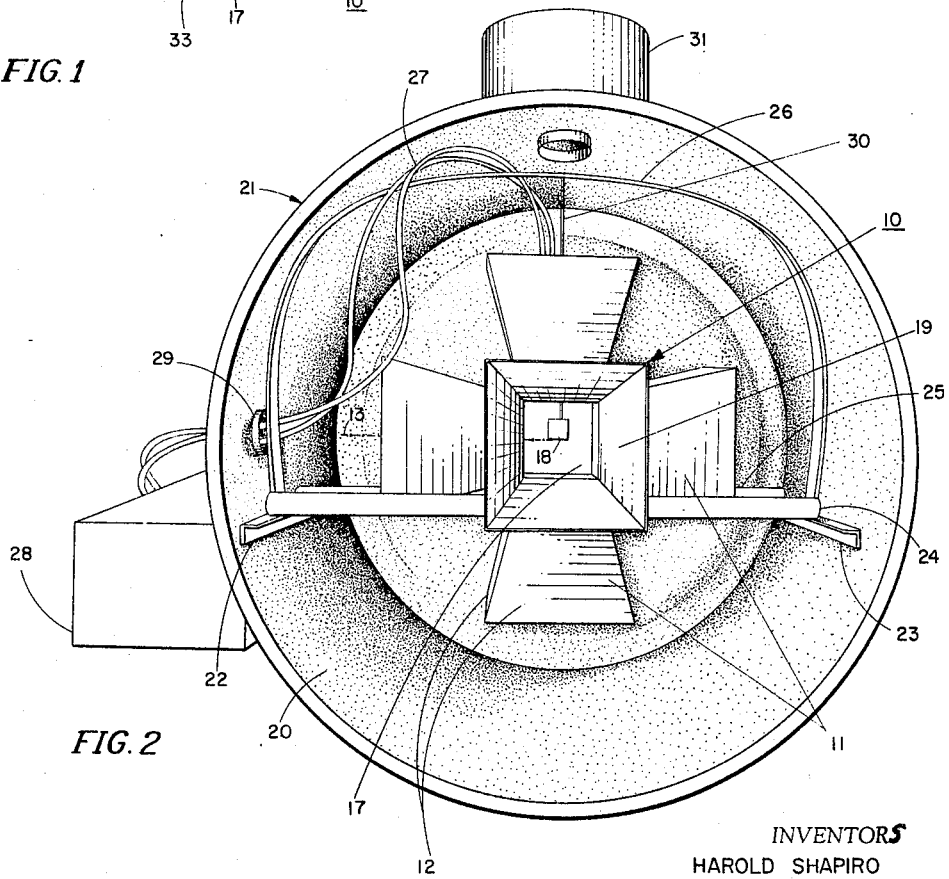
FIGURE 2 is a perspective view of the preferred embodiment of the invention of FIGURE 1 shown in cooperation with a vacuum chamber.

As shown in FIGURE 1 the six hollow tetrahedral truncated pyramids 11 are joined together at their smaller convergent ends 16 by welding or similar joining techniques such that a hollow cubical test area 17 is formed at the junction thereof with the joined ends of the pyramids 11 forming, as sharp edges, the outline of hollow cubical test area 17. Within and substantially in the center of this hollow cubical test area 17, is placed a test object (specimen) 18 as shown in FIGURE 2. As seen in this figure the divergent ends (exit) 36 of the pyramids face inner wall 20 of vacuum chamber 21. For illustration purposes, the vacuum chamber is shown in an open condition.

In the preferred embodiment of the invention pyramids 11 are constructed of metal, such as copper, in which the inner surfaces 19 of sides 12 are highly polished. Should the metal be of a type wherein it is difficult to obtain a high polish, then the inner surfaces 19 may be plated with chromium, gold or other reflective metals and then polished. As there is no requirement that the pyramids 11 be constructed of metal, this latter plating technique would be applicable to other than metal surfaces, should pyramids 11 be so constructed.

It is desirable that the inner surfaces 19 be highly polished to minimize the random back-scatter of the molecules emitted from test object 18. In this manner there is greater assurance that the emitted molecules will not return to test area 17.

Referring again to FIGURE 2, there is attached to inner wall 20 of vacuum chamber 21, brackets 22, 23, on which are mounted supporting rods 24, 25, upon which rests omni-directional anisotropic molecular trap 10. A curved holding strap 26 is attached between brackets 22, 23, and over the uppermost pyramid 11 so that the test object 18 can be attached thereto by string, wire or the like 30 and held substantially in the center of test area 17. This curved holding strap 26 also behaves as a support for electrical cabling 27 that is connected from power source and instrument box 28 through a sealed opening 29 in vacuum chamber 21 to test object 18 to supply power thereto and connect probes thereof to instruments in box 28. An exhaust pump 31, attached to vacuum chamber 21, is used to evacuate the chamber after it is sealed.

The invention operates as follows:

With ODAMT 10 located in vacuum chamber 21 exhausted to a low pressure and a test object 18 positioned substantially in the center of test area 17 of ODAMT 10 and held there by string 30, molecules vaporized by test object 18 have exposed to their path the open space of the six hollow truncated pyramids 11 and the sharp edges formed at the junctions of the smaller convergent ends 16 of pyramids 11. It can readily be observed that with such a situation existing there is very little likelihood that emitted molecules will remain within the test area 17 as there is essentially no barrier to impede their travel therefrom. Instead, the molecules will find an exit via the hollow pyramids 11.

Upon entering the pyramids, the molecules move outwardly between the sloping walls 12 until they rebound from a far place, be it a bend or any other surface. Those striking the wall of the pyramids 11, since there is substantially no surface area normal to their flight path, rebound at an angle from the side of the pyramid which, for the most part, will be away from the central test area 17. Molecules rebounding in the space outside the confines of omni-directional anisotropic molecular trap 10 are then subject to removal by exhaust pump 31; and this is the method used for the final removal of the molecules from vacuum chamber 21. From this explanation it can be seen that the test area 17 of the ODAMT 10 provides an even better vacuum than is provided by the vacuum chamber itself.

Sides 12 of the pyramids may be modified by attaching to the outer surface thereof circulating coil 32 (see FIGURE 1) for passing liquid nitrogen or helium therethrough. Cryogenic cooling is then obtained which reduces the kinetic energy of the existing molecules thereby making it more difficult for them to rebound from the inner surface 19 of sides 12 of pyramids 11 when they impinge thereon. Now by bonding to the cryogenically cooled inner surfaces 19 a molecular sieve material 33, such as activated charcoal or zeolite, cryosorption is accomplished. This adaptation of cryogenic cooling and cryosorption to the omni-directional anisotropic molecular trap 10 better insures that the molecules vaporized by the test object 18 will not return to the test area 17.

The efficiency can be improved further by surrounding the four pyramids in the x–y plane with a revolving "squirrel cage" type wheel structure 34 (partial showing thereof in FIGURE 1) having vanes 35 positioned at angles such that they deflect the molecules away from the pyramid exits 36 at an increased angular momentum. In this manner there is much less opportunity for any emitted molecule to return to the test area.

While ODAMT 10 has been described as being assembled before the test object is positioned within the test area thereof, it should be understood that the pyramids could be assembled together about the test object. This might be particularly applicable should the test object be of large dimensions, such as, an entire spacecraft.

It should be also noted, that instead of the sides of the pyramids of the omni-directional anisotropic molecular trap 10 being solid planes, they may be constructed of wire grids which can be positively charged to repel ions. They would be formed in two layers with the inner layer carrying an electric current such that molecules coming within its influence are ionized and the outer layer carrying a charge that repel the ionized molecules.

While the preferred embodiment of the omni-directional anisotropic molecular trap has been described with the sides of the pyramids having a slope of 15°, it should be understood that the invention would still function should the slope vary from any angle greater than zero degree to less than 90 degrees. In addition, the omni-directional anisotropic molecular trap can be formed other than by hollow tetrahedral pyramids. For example, hollow horn-shaped structures and hollow polyhedrons of three or more sides or cone shaped structures could perform the same function as long as they have sloping walls and are joined together in a manner which meets one of the main criteria of this invention, that is, providing a test area having a minimum wall surface exposed to the emitted molecules. In other words, it is a requirement of the ODAMT that the emitted molecules have before them substantially all open space so that they will have only a limited surface from which they can rebound to the test object. In addition, it is essential that the ODAMT be constructed to have a configuration which will result in the molecules being deflected in a direction away from the test area.

Although the foregoing disclosure relates to a preferred embodiment of the invention, it is obvious that numerous modifications or alterations may be made therein without departing from the spirit and scope of the invention set forth in the appended claims.

What is claimed is:

1. In an evacuated vacuum chamber having an evacuating pump means and wherein it is desired that substantially all molecular bounce-back of molecules liberated from an object being tested therein be eliminated, the improvement comprising: a structure for forming within said chamber a defined area for locating said object, said structure providing substantially no wall surface perpendicular to the travel of said molecules; means attached to said structure for deflecting said liberated molecules in a direction away from said object; and a rotating means located in the path of said molecules to deflect said molecules in a direction such that they can be exhausted from said chamber by said pump means.

2. In the evacuated vacuum chamber of claim 1, the improvement further including: means associated with said deflecting means to effect cryogenic cooling to reduce the kinetic energy of said molecules, thereby making it more difficult for them to rebound from said deflecting means.

3. In the evacuated vacuum chamber of claim 2, the improvement further including: means associated with said deflecting means for accomplishing cryosorption.

4. In an environmental chamber having an evacuating pump, an apparatus for insuring that molecules vaporized by an object located therein will not return to said object, said apparatus comprising: a plurality of hollow horn-shaped structures having diverging and converging ends, said horn-shaped structures being joined together at said converging ends and forming substantially sharp edges at the junctions thereof which outline a defined area for locating said object, whereby molecules emitted from said object, having only a limited surface perpendicular to their travel, do not bounce-back but instead, move away from said object and are exhausted from said chamber by means of said evacuating pump.

5. The apparatus of claim 4 further including: means associated with said horn-shaped structures for effecting cryogenic cooling and cryosorption for further insuring that molecules will not return to said object, and rotating deflecting means positioned relative to said diverging ends of said horn-shaped structures to impart an increased angular momentum to said molecules coming in contact therewith such that their direction of travel is away from said object.

6. An apparatus for insuring that the molecular bounce-back of molecules vaporized by an object in an environmental chamber having an evacuating pump is substantially zero comprising: a plurality of hollow polyhedrons having sloping sides forming diverging and converging ends, said plurality of hollow polyhedrons being joined to each other at said converging ends such that the junctions thereof form sharp edges which outline a defined area, whereby, when said object is located in said defined area, the molecules emitted therefrom, having before them the open space of said hollow polyhedrons and said sharp edges formed at the junctions thereof, for the most part, do not bounce-back to said object, but instead, travel away therefrom and are exhausted from said environmental chamber by said evacuating pump.

7. The apparatus of claim 6 wherein said hollow polyhedrons are hollow truncated cones, and wherein the inner surface of said hollow cones is highly polished.

8. The apparatus of claim 6 further including a rotating means located in the path of said molecules to deflect said molecules away from said diverging ends of said polyhedrons at an increased angular momentum.

9. The apparatus of claim 8 further including: means associated with said polyhedrons for accomplishing cryogenic cooling and cryosorption to reduce the possibility of molecular bounce-back to said object.

10. The apparatus of claim 6 wherein said hollow polyhedrons are six in number and are hollow tetrahedral truncated pyramids.

11. The apparatus of claim 10 wherein said hollow truncated pyramids are metallic and have their inner surface thereof highly polished.

12. The apparatus of claim 11 further including: a rotating deflecting means surrounding the diverging ends of four of said pyramids having central axes thereof in a common plane, whereby said rotating deflecting means increases the angular momentum of said molecules and deflect said molecules away from said diverging ends of said pyramids.

13. In a vacuum chamber wherein it is desired that an object under test therein having molecules vaporized therefrom have substantially no molecular bounce-back, the improvement comprising: a plurality of hollow polyhedrons having sloping sides forming diverging and converging ends, said plurality of hollow polyhedrons being joined together at said converging ends to form junctions having the inside portions thereof as sharp edges which outline a defined area, and a rotating deflecting means positioned relative to said diverging ends, whereby, when said object is located in said defined area, the molecules emitted therefrom travel in a direction away from said object and are directed by said rotating deflecting means at an increase angular momentum such that they are exhausted from said chamber.

14. In a vacuum chamber for insuring that substantially all molecules vaporized by an object under test therein will not return to said object, said improvement comprising: six hollow tetrahedral truncated pyramids joined together at their convergent ends such that the junctions thereof form sharp edges which outline a hollow cubical test area, whereby when said object is located in said test area and molecules are vaporized therefrom, said molecules seeing only open space, sharp edges and outwardly slanting walls, travel in a direction away from said object and do not rebound thereto.

15. In the vacuum chamber of claim 14, said pyramids having sides, the inner surfaces thereof being highly polished.

16. In the vacuum chamber of claim 14, the improvement further including: means being attached to said pyramids to effect cryogenic cooling to reduce the kinetic energy of said molecules, thereby making it more difficult for them to rebound from said outwardly slanting walls.

17. In the vacuum chamber of claim 16, said pyramids having inner surfaces thereof having affixed thereto means for accomplishing cryosorption.

18. In the vacuum chamber of claim 16, the improvement further including: a revolving squirrel cage type wheel having vanes for deflecting said molecules and positioned to surround four of said six pyramids having their central axes in a common plane, whereby said vanes act to deflect said molecules away from the divergent ends of said four pyramids.

References Cited by the Examiner

UNITED STATES PATENTS 3,066,528 12/1962 Giannini et al. _____ 73—147
3,130,562 4/1964 Wood et al. _____ 73—432 X
3,131,396 4/1964 Santeler et al. _____ 73—432 X DAVID SCHONBERG, *Primary Examiner.*